United States Patent
Kim

(10) Patent No.: US 6,334,217 B1
(45) Date of Patent: Dec. 25, 2001

(54) CHANNEL SELECTING METHOD AND APPARATUS

(75) Inventor: Pan-Jin Kim, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/008,317

(22) Filed: Jan. 20, 1998

(30) Foreign Application Priority Data

Jun. 21, 1997 (KR) .................................................. 97-26367

(51) Int. Cl.⁷ ................................. H04N 5/45; H04N 7/00
(52) U.S. Cl. .......................... 725/38; 725/139; 725/151; 348/565; 348/731; 348/734
(58) Field of Search .................................. 348/731, 588, 348/725, 732, 735, 564, 565, 734; 455/186.1, 186.2; 725/38–151, 37; H04N 5/44

(56) References Cited

U.S. PATENT DOCUMENTS

| Re. 34,340 | * | 8/1993 | Freeman | .................................. 358/86 |
| 5,250,933 | * | 10/1993 | Beaudin et al. | ....................... 345/115 |
| 5,585,865 | * | 12/1996 | Amano et al. | ......................... 348/731 |
| 5,604,543 | * | 2/1997 | Baek | .................................... 348/564 |
| 5,900,916 | * | 5/1999 | Pauley | .................................. 348/565 |
| 5,933,192 | * | 8/1999 | Crosby et al. | ........................ 348/387 |
| 5,959,659 | * | 9/1999 | Dokic | ....................................... 348/7 |
| 5,973,748 | * | 10/1999 | Horiguchi et al. | .................... 348/554 |

OTHER PUBLICATIONS (Webster's Dictionary—10th Edition; p. 918), 1997.*

* cited by examiner

*Primary Examiner*—Andrew Faile
*Assistant Examiner*—Reuben M. Brown
(74) *Attorney, Agent, or Firm*—Staas & Halsey LLP

(57) ABSTRACT

A channel selecting method and apparatus. In addition to selecting a current viewing channel by using one of two tuners, a channel predicted to be selected is selected by using the other tuner. If a channel change to the channel predicted to be selected is requested, a signal of the selected channel is selected as a signal of the viewing channel.

26 Claims, 3 Drawing Sheets

CHANNEL SELECTING METHOD AND APPARATUS

BACKGROUND OF THE INVENTION

1. Field of the Invention

The present invention relates to an apparatus having a tuner, and more particularly, to a channel selecting method and apparatus.

2. Description of the Related Art

Generally, a video processor having a tuner, such as a video cassette recorder (VCR) or a television (TV) set, selects a new channel whenever there is a channel change request. The channel is changed by tuning a frequency of the new channel by the tuner. Hence, the channel change is delayed. In a digital TV set, such as a high definition television (HDTV), for viewing next generation digital broadcasting, it takes a longer time to select the channel in comparison with a TV for viewing NTSC (National Television Systems Committee) analog broadcasting. This is because the tuner requires a lot of time to tune the frequency of the new channel, and in particular, it takes a long time for a transport stream (TS) decoder contained in the digital TV to detect a start position of a reference screen. If the channel is changed, the TS decoder newly detects a packet identification (PID) supplied to the new channel and a start position of an intra (I) frame, thereby consuming a lot of time. Therefore, a viewer must wait that time period of when the channel is changed. That is, since a channel selecting operation is again started from the beginning whenever the channel is changed, it takes a long time to select the channel.

SUMMARY OF THE INVENTION

It is therefore an object of the present invention to provide a channel selecting method and apparatus which can reduce the time for changing a channel of an apparatus, such as a digital or analog TV or a video cassette recorder.

According to one aspect of the present invention, in addition to selecting a current viewing channel by using one of two tuners, a channel predicted to be selected is selected by using the other tuner. If a channel change to the channel predicted to be selected is requested, a signal of the selected predicted channel is selected as a signal of the viewing channel.

BRIEF DESCRIPTION OF THE DRAWINGS

The above and other objects, features and advantages of the present invention will be more apparent from a review of the following detailed description taken with the accompanying drawings.

DETAILED DESCRIPTION OF THE PREFERRED EMBODIMENT

In the following description, well known functions and constructions are not described in detail so as not to obscure the present invention.

Figure 1:
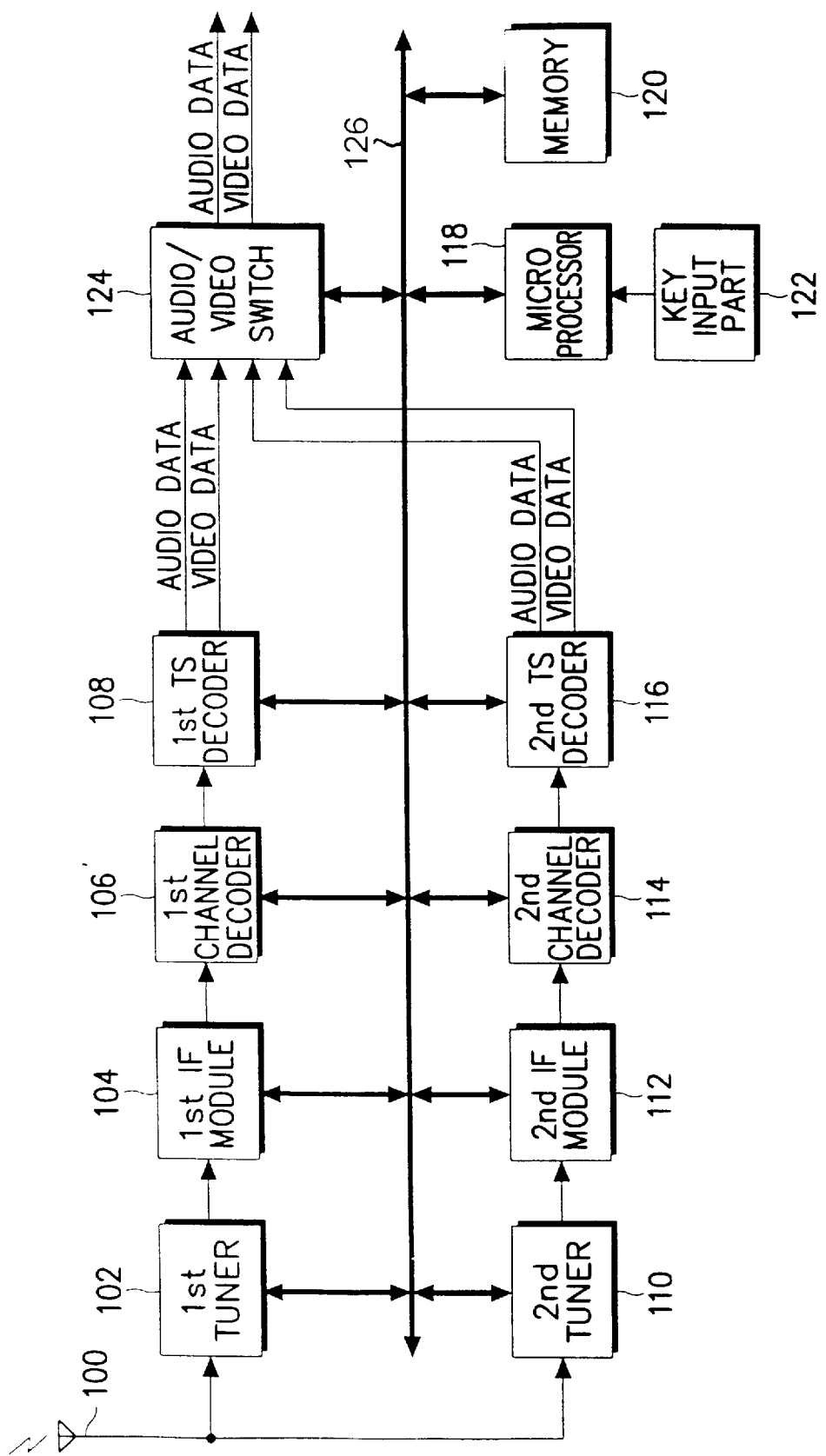
FIG. 1 is a block diagram of a channel selecting apparatus according to an embodiment of the present invention.

In FIG. 1, a channel selecting apparatus according to the present invention is applied to an HDTV utilizing the MPEG (Moving Picture Experts Group) standard. In the drawing, parts which are not directly related to the present invention are not shown. A first tuner 102 receives a digital TV broadcasting signal through an antenna 100 and selects a channel by the control of a microprocessor 118. Further, the first tuner 102 generates an intermediate frequency (IF) signal of the selected channel. A first IF module 104 converts the IF signal generated from the first tuner 102 into a baseband signal. A first channel decoder 106 decodes the baseband signal generated from the first IF module 104 to reproduce a data bit stream. A first TS decoder 108 separates the data bit stream reproduced from the first channel decoder 106 into audio and video data by the control of the microprocessor 118.

A second tuner 110 receives the digital TV broadcasting signal through the antenna 100 and selects a second channel by the control of the microprocessor 118. Further, the second tuner 110 generates the IF signal of the selected second channel. A second IF module 112 converts the IF signal generated from the second tuner 110 into the baseband signal. A second channel decoder 114 decodes the second baseband signal generated from the second IF module 112 to reproduce a second data bit stream. A second TS decoder 116 separates the second data bit stream reproduced from the second channel decoder 114 into second audio and video data by the control of the microprocessor 118.

The audio and video data generated from the first and second TS decoders 108 and 116 are supplied to an audio/video switch 124. The audio/video switch 124 selects either the outputs of the first TS decoder 108 or the outputs of the second TS decoder 116 as a signal of a current viewing channel by the control of the microprocessor 118. The audio and video data selected by the audio/video switch 124 are respectively supplied to an audio decoder (not shown) and a video decoder (not shown) and decoded according to the MPEG standard. The decoded audio and video data are signal-processed and generated as a voice and an image.

A key input part 122 is connected to the microprocessor 118 which is a controller of the HDTV. The key input part 122 has a keypad and has an infrared receiver for receiving an infrared signal from a remote controller. The microprocessor 118 controls the overall operation of the HDTV by executing a program stored in a memory 120 according to a key input from the key input part 122. The memory 120 includes a read only memory (ROM) for storing a program of the microprocessor 118, a random access memory (RAM) for temporarily storing data generated in the process of executing the program of the microprocessor 118, and an electrically erasable and programmable read only memory (EEPROM) for storing various reference data, etc.

The first and second tuners 102 and 110, the first and second IF modules 104 and 112, the first and second channel decoders 106 and 114, the first and second decoders 108 and 116, the memory 120, and the audio/video switch 124 are connected to the microprocessor 118 through a bus 126.

Figure 2A:
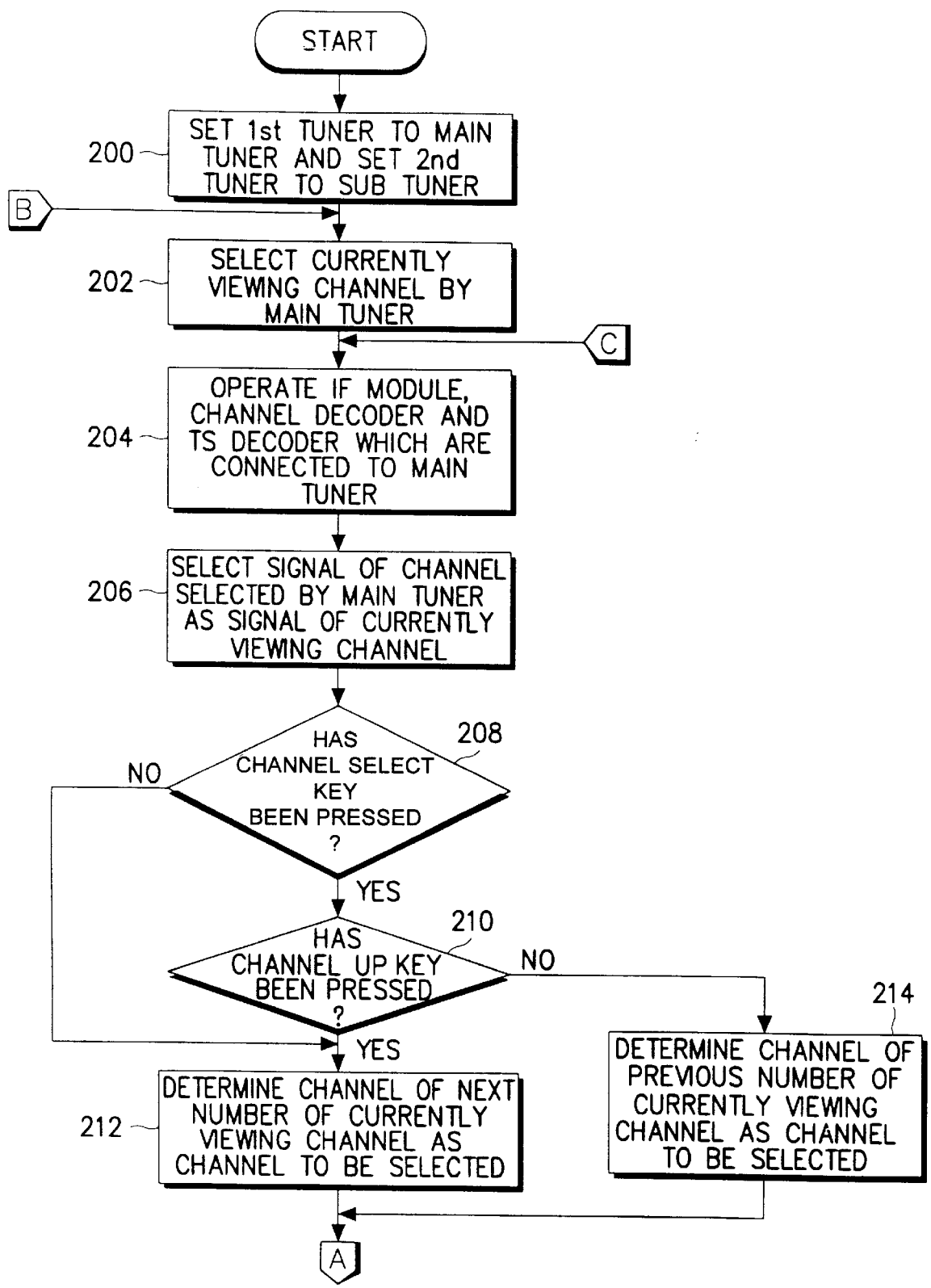
FIGS. 2A and 2B are flow charts showing a channel selecting process executed by a microprocessor shown in FIG. 1 according to an embodiment of the present invention.
Figure 2B:
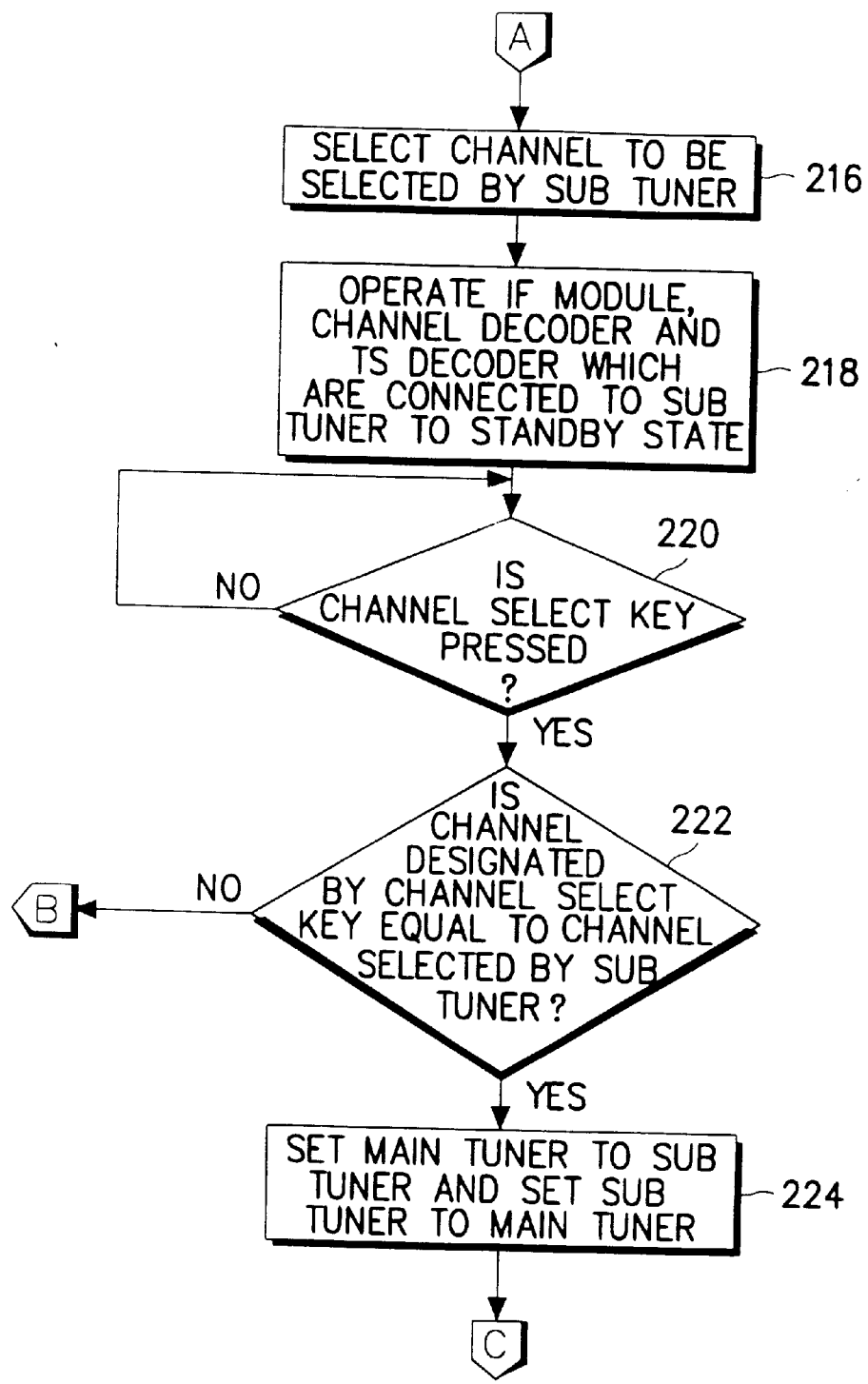

FIGS. 2A and 2B are flow charts showing a channel selecting process executed by the microprocessor 118 shown in FIG. 1. The functions illustrated in FIG. 2 are programmed in the ROM of the memory 120.

If a power source of the HDTV is supplied, the microprocessor 118 sets the first tuner 102 to a main tuner and sets the second tuner 110 to a sub tuner at step 200. The microprocessor 118 selects, at step 202, a current viewing channel by the first tuner 102 which is set to the main tuner. The microprocessor 118 operates the first IF module 104, the first channel decoder 106 and the first TS decoder 108 which are sequentially connected to the main tuner at step 204 (if the second tuner 110 is set to the main tuner, the microprocessor 118 operates the second IF module 110, the second channel decoder 114 and the second TS decoder 116). At step 206, the microprocessor 118 selects a signal of a channel selected by the main tuner, that is, the audio and video data generated from the first TS decoder 108 as a signal of the viewing channel by the audio/video switch 124. Therefore, the IF signal of the current viewing channel is generated from the first tuner 102 and converted into the baseband signal through the first IF module 104. The converted signal is decoded through the first channel decoder 106 and supplied to the first TS decoder 108. The audio and video data generated from the first TS decoder 108 are selected as the signal of the current viewing channel by the audio/video switch 124 and generated as a voice and an image.

At steps 208–218, the microprocessor 118 determines a channel predicted to be selected and selects the predicted channel by the second tuner 110 which is set to the sub tuner. Moreover, the microprocessor 118 operates, to a standby state, the second IF module 112, the second channel decoder 114 and the second TS decoder 116 which are sequentially connected to the second tuner 110. In more detail, at steps 208 to 210, the microprocessor 118 checks whether the channel select key (either a channel up key or a channel down key) has been pressed and if it is checked that the channel select key has been pressed, the microprocessor 118 checks whether the most recent inputted key corresponds to the channel up key or the channel down key. Whenever the channel up key or the channel down key has been pressed, the pressed key is distinguishable from the unpressed key by use of a flag to indicate the above key corresponding to the most recent channel select key that has been pressed. If the channel select has previously been pressed at step 208, the microprocessor 118 checks, at step 210, whether the channel up key has most recently been pressed. If the channel select key has not been pressed or if the channel up key has most recently been pressed, the microprocessor 118 determines, at step 212, a channel of the next number of the current viewing channel as a channel to be selected. If a channel down key has most recently been pressed, the microprocessor 118 determines a channel of the previous number of the current viewing channel as the channel to be selected at step 214. Step 212 or 214 is executed because the case that any one of the channel up and down keys is successively pressed is more frequent than the case that the channel up or down key is alternatively pressed. When the channel select key has not been pressed since the power source was supplied, a channel of the previous number of the currently viewing channel may be determined as the channel to be selected.

After selecting the channel to be selected, the microprocessor 118 selects the channel predicted to be selected by using the sub tuner at step 216. Next, the microprocessor 118 operates, to the standby state, the second IF module 112, the second channel decoder 114 and the second TS decoder 116 which are sequentially connected to the second sub tuner 110 at step 218. In other words, the frequency of the next channel which may be selected is already tuned by using the sub tuner. The PID and the start position of the I frame are detected by the second TS decoder 116 connected to the sub tuner.

The microprocessor 118 checks whether the channel select key is pressed at step 220. If the channel select key is pressed, the microprocessor 118 checks, at step 222, whether a channel designated by the channel select key is equal to the channel selected by the sub channel. If they are not equal to each other, step 222 returns to step 202. If they are equal to each other, the microprocessor 118 sets the main tuner to the sub tuner and sets the sub tuner to the main tuner at step 224. Step 224 is followed by step 204. Therefore, the first tuner 102 which is selecting the current channel is set to the sub tuner and the second tuner 110 is set to the main tuner. In this case, since the second tuner 110 has already selected a channel to be changed, it is possible to immediately change the channel without additional tuning. Furthermore, since the second IF module 112, the second channel decoder 114 and the second TS decoder 116 are in standby state, the broadcasting of the changed channel can be immediately viewed.

Therefore, in addition to selecting the currently viewing channel by using the first tuner, the next channel predicted to be selected by a user is selected by using the second tuner. Moreover, the IF module, the channel decoder and the TS decoder which are connected to the second tuner are prepared in advance of selection by the user, thereby greatly reducing the time for changing the channel. If the channel determined to be selected is different from the channel desired by the viewer, the same time as a conventional channel selecting method is required. However, since there is a high probability that the channel determined to be selected is equal to the channel desired by the viewer, the time for changing the channel can be reduced.

Although the illustrated embodiment of the present invention has been applied to the HDTV, it may be applicable to all apparatuses for selecting the channel by using the tuner. Moreover, 2 tuners, one IF module, one channel decoder and one TS decoder may be used instead of using two tuners, two IF modules, two channel decoders and two TS decoders. Furthermore, in an analog TV or a video cassette recorder, only two tuners are used without using the channel decoder and the TS decoder.

As described above, the time for changing the channel can be remarkably reduced by selecting in advance the next channel to be selected.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A channel selecting method of a video processor having first and second tuners, comprising the steps of:
   selecting a current viewing channel by using said first tuner;
   selecting a channel predicted to be selected next by using said second tuner; and
   if a channel change to the channel predicted to be selected next is requested, selecting a signal of the channel selected by said second tuner as a signal of said viewing channel, and if a channel has not been selected since a power source of said video processor was supplied, selecting a signal of the channel selected by said second tuner as a signal of said viewing channel.

2. A channel selecting method as claimed in claim 1, further comprising the step of predicting the channel to be selected next in response to a most recently pressed channel select key out of a channel up key and a channel down key.

3. A channel selecting method as claimed in claim 2, wherein the predicting step comprises the steps of:
   if said channel up key is the most recently pressed channel select key, determining a channel of a next number of said currently viewing channel as the channel to be selected next; and if said channel down key is the most recently pressed channel select key, determining a channel of a previous number of said currently viewing channel as the channel to be selected next.

4. A channel selecting apparatus of a video processor, comprising:
   a key input part including a channel select key;
   a first tuning unit to tune a first channel and to output audio and video data of the first channel;
   a second tuning unit to tune a second channel and to output audio and video data of the second channel;
   an audio/video switch to receive audio and video data of said first and second tuning units, and to output the audio and video data of one of said first and second tuning units as a signal of a current viewing channel; and
   a controller
      to select the current viewing channel by setting said first tuning unit as a main tuner,
      to selecting a channel predicted to be selected by setting said second tuning unit as a sub tuner,
      to set said second tuning unit as the main tuner when a channel change to the channel predicted to be selected is requested, and
      to select a signal of a channel selected by the main tuner as a signal of the current viewing channel by said audio/video switch,
   wherein the main tuner outputs the current viewing channel, and the sub tuner does not output the predicted channel.

5. A channel selecting apparatus of a video processor, comprising:
   a key input part including a channel select key;
   first and second tuners for selecting different channels;
   an audio/video switch for generating a signal of a current viewing channel; and
   a controller for selecting the current viewing channel by setting said first tuner to a main tuner, selecting a channel predicted to be selected by setting said second tuner to a sub tuner, setting said sub tuner to said main tuner when a channel change to the channel predicted to be selected is requested, and selecting a signal of a channel selected by said main tuner as a signal of said current viewing channel by said audio/video switch;
   first and second intermediate frequency modules for converting intermediate frequency signals generated from said first and second tuners into baseband signals, respectively;
   first and second channel decoders for decoding said baseband signals generated from said first and second intermediate frequency modules to reproduce data bit streams, respectively; and
   first and second transport stream decoders for separating said data bit streams reproduced by said first and second channel decoders, respectively, into corresponding audio and video data.

6. A channel selecting apparatus as claimed in claim 5, wherein said controller selects the channel predicted to be selected next in response to a most recently pressed channel select key out of a channel up key and a channel down key.

7. A channel selecting apparatus as claimed in claim 6, wherein said controller selects a channel of a next number of said current viewing channel as the channel predicted to be selected when said channel up key is the most recently pressed channel select key, and selects a channel of a previous number of said current viewing channel as the channel predicted to be selected when said channel down key is the most recently pressed channel select key.

8. A channel selecting apparatus as claimed in claim 7, wherein said controller selects the channel of said previous number as the channel predicted to be selected when said channel select key has not been pressed since a power source of said video processor was supplied.

9. A channel selecting apparatus as claimed in claim 8, wherein said controller sets said main tuner to said sub tuner and sets said sub tuner to said main tuner when the channel designated by said channel select key is equal to the channel selected by said sub tuner.

10. A channel selecting apparatus as claimed in claim 9, wherein said controller is a microprocessor of a main control device of said video processor.

11. A channel selecting apparatus of a video processor which receives a broadcast signal, comprising:
    a first tuning unit to process a first channel of the broadcast signal for current viewing, the first tuning unit comprising a first tuner and a first unit to convert the output of the first tuner to audio and video data;
    a second tuning unit to process a second channel of the broadcast signal predicted to be selected next while said first channel processes the first channel, the second tuning unit comprising a second tuner and a second unit to convert the output of the first tuner to audio and video data; and
    a controller to place the second unit of the second tuning unit in a standby state, receive a channel change request, and make the second channel the viewing channel by operating the second unit if the received channel change request matches the second channel.

12. A channel selecting apparatus as claimed in claim 11, wherein:
    said controller selects a third channel of the broadcast signal if the received channel change request fails to match the second channel; and
    said first tuning unit processes the first channel while the second tuning unit processes the third channel.

13. A channel selecting apparatus as claimed in claim 11, further comprising a switch for receiving the processed outputs from said first and second tuning units, and transmitting one of the processed outputs as the viewing channel based upon a switching signal from said controller.

14. A channel selecting apparatus as claimed in claim 13, wherein said controller sets said first tuning unit to a main tuner to make the first channel the viewing channel, sets said second tuning unit to a sub tuner, sets said sub tuner to said main tuner when the received channel change request matches the second channel, and outputs said switching signal so that said switch outputs the processed output of the main tuner as the viewing channel.

15. A channel selecting apparatus as claimed in claim 11, wherein said controller selects said second channel by predicting a next channel to be selected by a user.

16. A channel selecting apparatus as claimed in claim 15, further comprising a key input having a channel up input and a channel down input, wherein said controller sets the second channel to a next channel of said viewing channel if said channel up input has been most recently selected, to a previous channel of said viewing channel if said channel down key has been most recently selected.

17. A channel selecting apparatus as claimed in claim 15, further comprising a key input having a channel select input, wherein said controller sets the second channel to a next channel of said viewing channel if said channel select input has been most recently selected.

18. A channel selecting apparatus as claimed in claim 15, further comprising a key input having a channel select input, wherein said controller sets the second channel to a previous channel of said viewing channel if said channel select input has not been set since a power source for said controller has been supplied thereto.

19. A channel selecting apparatus as claimed in claim 11, wherein said first and second tuners generate respective first and second intermediate frequency (IF) signals from the respective first and second first and second units comprise:
   first and second intermediate frequency modules to respectively convert said first and second IF signals to first and second baseband signals, respectively;
   first and second channel decoders to decode said respective first and second baseband signals to first and second data bit streams, respectively; and
   first and second transport stream decoders to respectively separate said first and second data bit streams into first audio and video data and second audio and video data, respectively.

20. A channel selecting apparatus of a video processor which receives a broadcast signal, comprising:
   a controller to select a first channel of the broadcast signal as a current viewing channel based upon an input from a user, and to predict a second channel of the broadcast signal as a next viewing channel based upon a channel select input;
   a first tuner to process the first channel selected by the user; and
   a second tuner to process the second channel predicted by said controller,
   wherein said second tuner does not output the predicted second channel while the first channel is the current viewing channel.

21. A channel selecting apparatus as claimed in claim 20, wherein said controller selects the second channel as the viewing channel if a channel change request matches the second channel.

22. A channel selecting apparatus as claimed in claim 21, further comprising a switch to receive the first and second processed outputs of said first and second tuner, said first and second tuner processing the respective first and second channels simultaneously, wherein said controller enables said switch to output one of the first and second processed outputs as the viewing channel.

23. A channel selecting apparatus of a video processor which receives a broadcast signal, comprising:
   a controller to select a first channel of the broadcast signal as a current viewing channel based upon an input from a user, and to predict a second channel of the broadcast signal as a next viewing channel based upon a channel select input;
   a first tuner to process the first channel selected by the user;
   a second tuner to process the second channel predicted by the controller; and
   a switch to receive the first and second processed outputs of said first and second tuner, said first and second tuner processing the respective first and second channels simultaneously,
   wherein said controller
      enables said switch to output one of the first and second processed outputs as the viewing channel,
      selects the second channel as the viewing channel if a channel change request matches the second channel, and
      selects a third channel and said first tuner processes the third channel as the viewing channel if the channel change request does not match the second channel.

24. A method of selecting channels of a broadcast signal, comprising:
   selecting a first channel of the received broadcast signal as a current viewing channel;
   predicting without displaying a second channel of the broadcast signal;
   receiving a channel selection for one of the broadcast channels while the first channel is the current viewing channel; and
   selecting as the current viewing channel:
      the predicted second channel if the one channel is the second channel, and
      a third channel if the one channel is not the predicted second channel.

25. A method as claimed in claim 24, further comprising the steps of:
   predicting the second channel prior to selecting the second channel based upon a channel select input from a user;
   receiving a channel change request from the user; and
   changing the viewing channel from the first channel to the second channel if the channel change request matches the second channel.

26. A method of selecting channels of a broadcast signal, comprising:
   selecting a first channel of the broadcast signal as a current viewing channel;
   predicting without displaying a second channel of the broadcast signal based upon a channel select input from a user prior to receiving a channel select input from a user to change the viewing channel; and
   selecting the second channel as the viewing channel if the channel select input matches the second channel.

* * * * *

UNITED STATES PATENT AND TRADEMARK OFFICE
CERTIFICATE OF CORRECTION

PATENT NO.      : 6,334,217 B1
DATED           : December 25, 2001
INVENTOR(S)     : Pan-Jin Kim It is certified that error appears in the above-identified patent and that said Letters Patent is hereby corrected as shown below:

<u>Title page,</u>
Item [56], References Cited, U.S. PATENT DOCUMENTS, insert the following reference:
-- 5,615,338    3/1997    Poole et al. . . . . . . . . . . . . . . . . . .712/223 --

Signed and Sealed this

Thirteenth Day of August, 2002

Attest:

JAMES E. ROGAN
Attesting Officer        Director of the United States Patent and Trademark Office